United States Patent [19]
Doom

[11] Patent Number: 4,840,528
[45] Date of Patent: Jun. 20, 1989

[54] LOCKING HITCH PIN ASSEMBLY

[76] Inventor: Harvey A. Doom, Rte. 2, Box 168A, Smithland, Ky. 42801

[21] Appl. No.: 155,735

[22] Filed: Feb. 16, 1988

[51] Int. Cl.⁴ ............................................. F16B 21/02
[52] U.S. Cl. ..................................... 411/351; 411/340
[58] Field of Search ........ 411/351, 352, 353, 340–341, 411/343–344

[56] References Cited

U.S. PATENT DOCUMENTS

| | | | |
|---|---|---|---|
| 2,180,558 | 11/1939 | Stastny | 411/340 X |
| 2,204,116 | 6/1940 | Blocher | 411/351 X |
| 2,856,806 | 10/1958 | Gibbons, Jr. | 411/341 |
| 3,132,556 | 5/1964 | Doering et al. | 411/340 |
| 3,175,453 | 3/1965 | Williams | 411/352 |
| 3,926,089 | 12/1975 | Ruebig et al. | 411/340 |
| 4,036,097 | 7/1977 | Greenwood | 411/340 |
| 4,236,439 | 12/1980 | Imai | 411/346 |
| 4,443,144 | 4/1984 | Defrancq | 411/351 |
| 4,773,805 | 9/1988 | Krahling | 411/351 |

FOREIGN PATENT DOCUMENTS

| | | | |
|---|---|---|---|
| 535508 | 10/1931 | Fed. Rep. of Germany | 411/351 |
| 2819624 | 11/1979 | Fed. Rep. of Germany | 411/340 |
| 365261 | 11/1938 | Italy | 411/340 |

*Primary Examiner*—Gary L. Smith
*Assistant Examiner*—Curtis B. Brueske
*Attorney, Agent, or Firm*—King & Schickli

[57] ABSTRACT

A hitch pin assembly is provided for locking equipment, such as a crossbar, to a tractor. The hitch pin comprises a locking pin having a head and a pivoted pull ring serving as the locking mechanism. A spring loaded rod including a keeper notch is retained coaxially within the locking pin. An access slot in the pin is provided in alignment with the notch to allow receipt of the ring as it swings toward the pin for locking. The spring loaded rod is retracted into the locking pin, allowing the keeper notch to capture the pull ring. The rod is then released and the pull ring is securely locked in a positive fashion in position. Pressing the rod back into the pin releases the ring to pivot outwardly from the keeper notch so that the locking pin can be removed.

7 Claims, 1 Drawing Sheet

LOCKING HITCH PIN ASSEMBLY

TECHNICAL FIELD

The present invention relates generally to a lockable pin assembly, and more specifically, to a lockable hitch pin suitable for use in agricultural equipment, particularly three-point tractor hitches and the like.

BACKGROUND OF THE INVENTION

This invention concerns a lockable hitch pin assembly which is ideally suited for use on a three-point hitch as found on farm tractors and other agricultural equipment. Generally, a three-point hitch includes three actuating links connected to a hydraulic lift cylinder operated by the hydraulic system of a tractor. The links are adapted to receive a transverse mounted crossbar or other hitching equipment, such as a pin and yoke. The crossbar generally extends through the ends of the bottom two links. The bar is retained in position by hitch pins positioned in transverse holes provided in each end of the crossbar. Various harvesting devices and other farm machinery may be secured to or towed by the tractor through the bar.

Generally, the standard hitch pin in use today consists of a pin having a head and pull ring pivotally attached to the head. The pull ring is provided as a means for extracting the hitch pin from the operative or installed position. This standard hitch pin can provide unsatisfactory results. More specifically, the pin can be accidently removed by contact with foreign material, such as underbrush, or severe shocks as are frequently found in farming equipment operations.

U.S. Pat. No. 2,856,806 to Gibbons discloses a coupling or hitch pin with a spring loaded retractable bolt retained within the pin. To position the pin in place to retain the crossbar, the bolt is first retracted within the pin. The pivoting pull ring is moved downwardly to a position inboard of the retractable bolt. The bolt is then allowed to return to its normal extended position whereupon the pull ring is held adjacent to the bolt shaft. Such a design, while an improvement over the standard hitch pin, is not without its disadvantages. Specifically, the pull ring is left to swing free behind the bolt and is susceptible to being snagged and elongated. Once deformed in this manner, the ring can be pivoted and moved over the bolt, and thus the pin accidently dislodged. Additionally, the bolt must extend a substantial distance out of the pin with this design, and is thus generally more susceptible to damage, as well as being accidentally directly retracted by contact with foreign material, allowing the pin to dislodge.

U.S. Pat. No. 3,926,089 Ruebig et al. discloses a hitch pin having a looped pull ring rotatably attached to the top of the pin. A notch is provided in the lower end of the pin and is adapted for receiving the pull ring. In use, the pin is inserted into its mating hole. The pull ring is then rotated downwardly and inserted into the notch in the pin. The pull ring is fabricated of a spring steel material and must be deformed slightly to be inserted in the notch. The spring force created by this deformation serves to retain the pull ring within its notch. However, with regular use, the pull ring tends to take on a permanent deformation. This deformation and its associated loss of spring tension serves to greatly reduce the effectiveness of the locking mechanism. Additionally, the heavy duty nature of the equipment used in farming applications would require a pull ring of such strength as to make installation and removal of this device by hand very difficult. Furthermore, locking pins of this type are also prone to be released by contact and snagging with foreign material.

A need exists, therefore, for a hitch pin which can be securely locked into place which is substantially immune to accidental release. Such a locking hitch pin would be reliable and simple to install yet capable of withstanding rigorous, heavy duty usage.

SUMMARY OF THE INVENTION

Accordingly, it is a primary object of the present invention to provide a hitch pin assembly overcoming the limitations and disadvantages of the prior art.

Another object of the present invention is to provide a lockable hitch pin which can not be accidentally disengaged by contact with foreign material, severe shock and the like.

Another object of the present invention is to provide a locking hitch pin which directly replaces the standard hitch pin, providing improved operation.

Still another object of the present invention is to provide a locking hitch pin which is simple, self-contained, and provides reliable operation.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a hitch pin assembly is provided for securing a crossbar or other equipment to a three-point hitch of a tractor, securely locking it into place.

The preferred embodiment of the hitch pin assembly selected to illustrate the invention includes a locking pin having a head, and a pull ring pivotably retained by the head. The pull ring serves as a locking mechanism, preventing the hitch pin from being accidentally knocked out of engagement.

According to an important aspect of this invention, a spring loaded rod including a keeper notch is retained coaxially within the locking pin. A transverse access slot is provided in the pin. The access slot is aligned with the notch in the spring loaded rod. Together, the access slot and the keeper notch allow receipt of the pull ring as it swings downwardly toward the pin for locking.

In use, the hitch pin assembly is inserted into a receiving transverse hole provided in the end of the crossbar or similar equipment hitch point. the spring loaded rod is retracted into the locking pin. This aligns the keeper notch with the access slot. The pull ring swings downwardly and into the access slot, allowing the keeper notch to firmly capture the pull ring. After the pull ring is captured, the rod is then released and the pull ring is securely locked in position by the keeper notch. Removal is as simple as installation, as pressing the rod back into the pin releases the ring from the keeper notch so that the locking pin can be removed.

Advantageously, the keeper notch securely captures and holds the pull ring within the confines of the pin itself. Once retained, the pull ring can not be accidentally dislodged by contact with foreign material. The rod extends outwardly from the pin only a short distance sufficient to allow a limited inward movement to release the ring from the notch. Additionally, once locked into place, the hitch pin is substantially immune from disengagement by severe shock since the ring is positively held in position at two points, diametrically opposite each other.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing.

Figure 1:
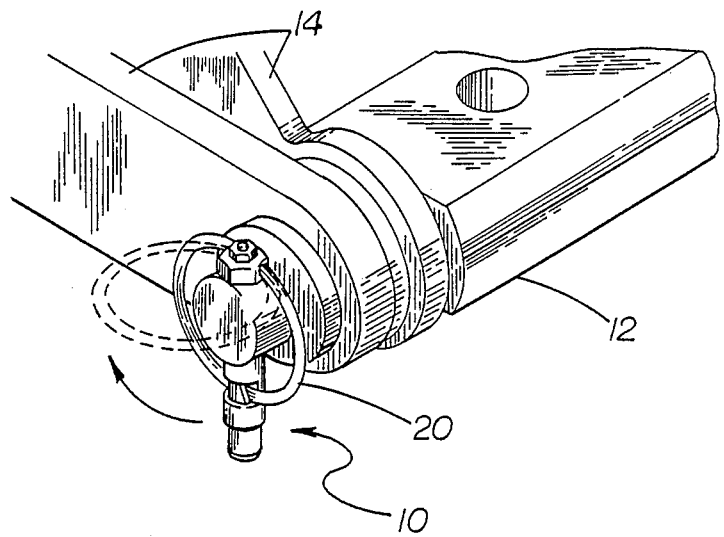
FIG. 1 is a perspective view of the hitch pin assembly of the present invention shown installed in a three-point hitch of a tractor and further showing the pull ring unlocked in phantom.

Reference will not be made in detail to the present preferred embodiment of the invention, an example of which is illustrated in the accompanying drawing.

DETAILED DESCRIPTION OF THE INVENTION

Reference is now made to the drawing figures showing a hitch pin assembly 10 of the present invention. The hitch pin assembly 10 is ideally suited for use in farming implement applications, including the three-point hitch systems commonly found on tractors. The hitch pin assembly 10 is designed to be self-contained and easy to use, yet provide reliable operation.

As shown in FIG. 1, the hitch pin assembly 10 is used to assure that crossbar 12 and tractor three-point hitch links 14 remain in engagement. As is known to those skilled in the agricultural equipment art, the hitch pin assembly 10 of the present invention can be used in a great many other tractor and farm equipment applications where the use of a retaining pin is desirable. In addition to securing the separate crossbar 12, such farm equipment as harvesters of all types, hydraulic post hole digger, plow, disc and mower include a similar mounting bar or stub shafts that can be readily attached to the three-point hitch in accordance with the teachings of my invention. Of course, within the broader aspects of the invention, the hitch pin assembly 10 can be used to positively retain other similar mechanical joints outside the farm implement field.

Figure 2:
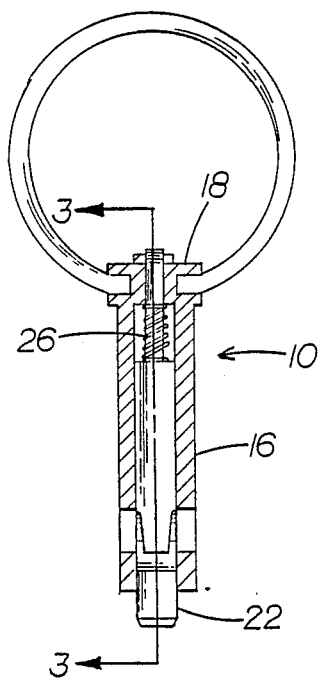
FIG. 2 is a cross sectional view of the hitch pin assembly of the present invention.

As shown in FIG. 2, the hitch pin assembly 10 includes a locking pin 16 having a head 18. Pull ring 20 is pivotably retained by head 18. As will be described in more detail below, pull ring 20 serves as a locking mechanism, preventing the hitch pin 10 from being accidently knocked out of engagement.

Figures 3A, 3B:
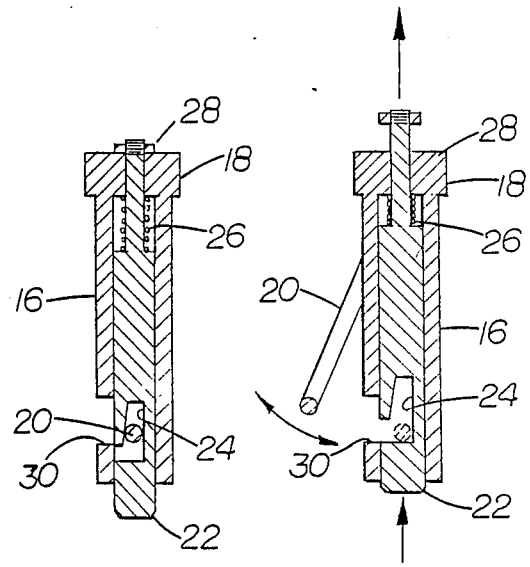
FIG. 3A is a cross-sectional view of the hitch pin assembly taken along section line 3—3 of FIG. 2 showing the pull ring in the locked position.
FIG. 3B is a cross-sectional view of the hitch pin of the present invention also taken along section line 3—3 of FIG. 2 showing the retractable rod biased to the upper position allowing the pull ring to be released.

According to an important aspect of this invention and as best shown in FIG. 3A, spring loaded rod 22 is retained coaxially within locking pin 16. Rod 22 includes keeper notch 24 provided to securely retain the pull ring 20 in a locked position. Rod 22 is downwardly biased by spring 26. Rod 22 extends through head 18. The upper end of rod 22 which extends through head 18 terminates in a threaded portion designed to receive a lock nut 28. Lock nut 28 is provided as a means for keeping spring loaded rod 22 within pin 16 against the biasing force of spring 26.

During use, and as is shown in FIG. 3B, spring loaded rod 22 is retracted within locking pin 16 by finger pressure of the operator (see action arrows). By retracting rod 22, the keeper notch 24 and access slot 30 provided in pin 16 come into alignment. This allows pull ring 20 to be rotated into or out of pin 16 as desired. Once pull ring 20 is within the keeper notch 24, rod 22 is released, securely retaining and holding pull ring 20 (shown in FIG. 3A). This provides a secure locking arrangement. The ring in effect is positively held at diametrically opposite positions; i.e. held at its pivot point in the head 18 and at the opposite side that swings into the notch 24 (see also FIG. 1).

Once locked and held in place, the pull ring 20 can not accidentally come loose. Because ring 20 is securely retained within pin 16, outside snagging or jarring forces can not serve to accidentally unlock the pull ring 20.

Removal of the hitch pin assembly 10 involves simply pressing the free end of rod 22 for retracting within pin 16 to bring keeper notch 24 and access slot 30 once again into alignment. This allows the non-pivoted side of the pull ring 20 to be removed by swinging outwardly. Once pull ring 20 ius removed, rod 22 is released. The hitch pin 10 is then pulled out of its mating hole in crossbar 12 by the ring 20 and removed.

In summary, numerous benefits result from employing the concepts of the present invention. The hitch pin assembly 10 of the present invention can be used in all applications requiring the use of a standard hitch pin. Unlike standard hitch pins, however, the ring 20 of the hitch pin assembly 10 can abe securely locked and positively held into place. Once securely locked into position, the hitch pin assembly 10 can not be removed until it has been unlocked. Therefore, accidental disengagement is substantially prevented.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A locking hitch pin assembly comprising:
   a locking pin having first and second ends;
   a head being provided at said first end;
   a pull ring rotatably retained by said head to allow swinging movement toward and away from said second end of said locking pin; and
   means for retaining said pull ring in said pin adjacent said second end, said retaining means being retractable within said locking pin and including a keeper notch for capturing said pull ring; whereby when said pull ring is pivoted to come into engagement with said pin, said ring being positively retained and held therein.

2. The assembly of claim 1, wherein said retaining means includes an internal rod, said rod being mounted coaxially within said locking pin.

3. The assembly of claim 1, wherein said locking pin includes a slot adjacent said second end; said slot extending transversely across said pin.

4. The assembly of claim 2, including biasing means to urge said rod towards said second end of said pin.

5. The assembly of claim 4, said biasing means is a coil spring acting on said rod.

6. The assembly of claim 1, including means for keeping said retaining means within said locking pin.

7. The assembly of claim 6 said keeping means is a lock nut threaded on said retaining means.

* * * * *